United States Patent [19]

Takeuchi et al.

[11] Patent Number: 4,742,901
[45] Date of Patent: May 10, 1988

[54] DEVICE FOR ADJUSTING A CLEARANCE OF A TWIN CLUTCH

[75] Inventors: Hiroshi Takeuchi, Higashi; Koji Kajitani, Neyagawa, both of Japan

[73] Assignee: Kabushiki Kaisha Daikin Seisakusho, Osaka, Japan

[21] Appl. No.: 20,977

[22] Filed: Mar. 2, 1987

[30] Foreign Application Priority Data

Mar. 7, 1986 [JP] Japan .................................. 61-33399

[51] Int. Cl.$^4$ .............................................. F16D 13/75
[52] U.S. Cl. .............................. 192/70.25; 192/111 A; 403/71
[58] Field of Search ................... 192/70.25, 111 A; 188/79.5 GT, 79.5 SS, 196 B; 403/71, 69, 70; 411/523, 524, 918

[56] References Cited

U.S. PATENT DOCUMENTS

| | | | |
|---|---|---|---|
| 2,923,385 | 2/1960 | Tinnerman | 411/918 X |
| 3,163,849 | 12/1964 | Meyer | 340/347 AD X |
| 3,360,089 | 12/1967 | Cockerill et al. | 192/111 A |
| 3,613,849 | 10/1971 | Pape | 192/84 B |
| 4,207,972 | 6/1980 | Zeidler | 192/111 A |
| 4,339,023 | 7/1982 | Maycock | 192/111 A X |
| 4,466,524 | 8/1984 | Lane | 192/70.25 |
| 4,684,002 | 8/1987 | Takeuchi | 192/70.25 |

FOREIGN PATENT DOCUMENTS

| | | | |
|---|---|---|---|
| 850844 | 9/1952 | Fed. Rep. of Germany | 192/111 A |
| 3538444 | 4/1986 | Fed. Rep. of Germany | 192/111 A |
| 966888 | 8/1964 | United Kingdom | 192/111 A |

Primary Examiner—Rodney H. Bonck
Attorney, Agent, or Firm—Armstrong, Nikaido, Marmelstein & Kubovcik

[57] ABSTRACT

A device for adjusting a clearance of a twin clutch comprises stopper pins disposed between the flywheel and a support member and extending through holes formed in projections of a intermediate plate in an axial direction of the clutch, respectively; and stopper springs fixed to the projections, engaged with the stopper pins and adapted to allow a movement of the stopper pins toward a support member relative to the intermediate plate and to prevent a movement of the stopper pins in the opposite direction relative to the intermediate plate. Each stopper spring is made of bent metal sheet and has two end portions, a radially outer portion integrally formed between the two end portions and an integrally formed side portion at the side of one of the end portions for engaging the side edge of the intermediate plate projections to prevent movement or rattle of the stopper spring. Each end portion covers an end surface of the projection facing in the axial direction and is provided with an aperture, through which the stopper pin is inserted, and radial lips, which are divided by radial slits extending from the inner periphery of the aperture and are engaged with the stopper pin.

1 Claim, 1 Drawing Sheet

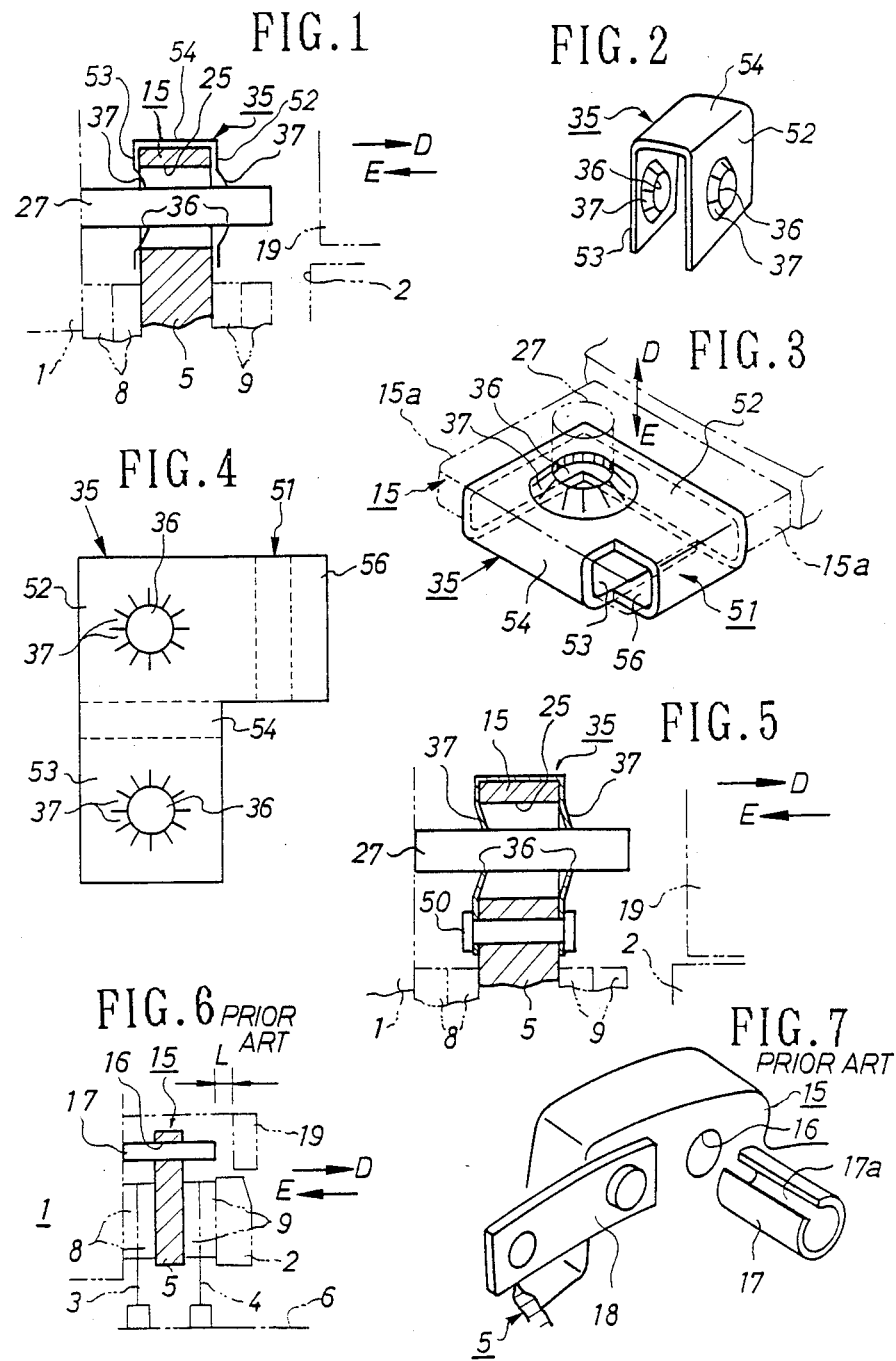

DEVICE FOR ADJUSTING A CLEARANCE OF A TWIN CLUTCH

BACKGROUND OF THE INVENTION

The present invention relates to an improvement of device for adjusting a clearance of a twin clutch, as dislcosed in U.S. patent application Ser. No. 791,825, filed on Oct. 28, 1985, now U.S. Pat. No. 4,684,002, dated Aug. 4, 1987, and assigned to the assignee hereof, in which two clutch disks are disposed with an intermediate plate therebetween.

In a known twin clutch, shown in FIG. 6, two clutch disks 3 and 4 are disposed between a flywheel 1 and a pressure plate 2 with an intermediate plate 5 therebetween. These members are of annular shape and are disposed concentrically to an output shaft 6, only a center line of which is illustrated, respectively. The clutch disks 3 and 4 are provided at the radially outer portions with friction facings 8 and 9, and are connected at radially inner hubs to the output shaft 6, respectively. An engaging-releasing mechanism (now shown), such as a diaphragm spring, is connected to the pressure plate 2. In the engaging operation of the clutch, said mechanism forces the pressure plate 2, so that the pressure plate 2 presses the facings 8 and 9 against the flywheel 1 and the intermediate plate 5.

The intermediate plate 5 is provided with a plurality of outer peripheral projections 15. Each projection 15 is provided with a hole 16 parallel to the output shaft 6. A stopper pin 17 is fitted into the hole 16.

As shown in FIG. 7, each stopper pin 17 is formed by a cylindrical spring member having one axially extending slit 17a, and is elastically compressively fitted into the hole 16. The projections 15 are connected to a flywheel ring 19 through elastic straps 18, so that the intermediate plate 5 is biased in a clutch disengaging direction D, shown in FIG. 6, by the straps 18. The flywheel ring 19 is integrally formed with the flywheel 1, and is arranged at the opposite side to the flywheel 1 with the projections 15 therebetween.

In the illustrated clutch engaged condition, the stopper pins 17 contact the flywheel 1, and an axial space L is formed between each stopper pin 17 and the flywheel ring 19.

According to the above structure, when the pressing force by the pressure plate 2 to the facing 9 is released, the facing 9 moves away from the pressure plate 2 and the intermediate plate 5, and the intermediate plate 5 is moved in the disengaging direction D by the elastic straps 18 to release the pressing force applied against the facing 8, so that the clutch disengages.

In this operation, the intermediate plate 5 moved in the direction D stops at a position at which the stopper pins 17 contact the flywheel ring 19, so that the intermediate plate 5 does not move excessively toward the pressure plate 2. Therefore, in the disengaging operation, the intermediate plate 5 is not pressed to the facing 9, and thus, a torque is not transmitted through the intermediate plate 5 and the clutch disk 4 to the output shaft 6.

When the facing 8 wears to some extent after a long use, the position of the intermediate plate 5 in the engaged condition moves toward the flywheel 1. In this case, after the stopper pins 17 contact the flywheel 1, the intermediate plate 5 is further forced by the pressure plate 2, and thus, a sliding occurs between the inner peripheral surfaces of the hole 16 and the stopper pins 17, so that the intermediate plate 5 moves in an engaging direction E with respect to the stopper pins 17.

However, in the above structure, there is a relatively large resistance between the inner surfaces of the holes 16 and the stopper pins 17 when the intermediate plate 5 moves in accordance with the wear of the facing 8, so that the pressing force applied from the plate 2 through the intermediate plate 5 to the facing 8 is reduced by the above frictional resistance. Therefore, it is difficult to press the facing 8 onto the flywheel 1 by a sufficiently large force, and thus, it is difficult to transmit a sufficiently large torque from the flywheel 1 to the clutch disk 3.

Further it is difficult to accurately set or adjust the frictional force between the inner surfaces of the holes 16 and the stopper pins 17 at an intended value. If the frictional force is too small, there is such a problem that the intermediate plate 5 moves in the disengaging direction D and is pressed to the facing 9 during the disengaging operation, even after the stopper pins 17 contact the flywheel ring 9. If the frictional force is too large, said problem, i.e., the reduction of the pressing force for the facing 8 in the engaging operation, becomes remarkable.

The above problem can be solved by employing one-way clutch mechanism as disclosed, e.g., in U.S. Pat. No. 3,360,089, in which a combination of spring washers and pins are used for adjusting the clearance.

However, in this structure, only one washer of merely annular shape is associated to each pin, and thus, only axially one portion of each pin is engaged with the washer, so that relatively large engaging force is generated in the engaged portions of the washer and the pin. Therefore, after a long use, it may be impossible to obtain an intended engaged condition due to the wear of the engaged portions.

Further, it is necessary to form recesses in the pressure plate for accomodating the washers and to fix auxiliary plates to the pressure plate for closing the recesses and holding the washers, which complicates the structures.

Accordingly, it is an object of the invention to provide an improved structure, overcoming the above-noted disadvantages.

SUMMARY OF THE INVENTION

According to the present invention, a device for adjusting a clearance of a twin clutch comprises a flywheel; a pressure plate; two clutch disks interposed between the flywheel and the pressure plate; an intermediate plate disposed between the clutch disks and provided with radial projections; a support member opposed to the flywheel with the intermediate plate therebetween; stopper pins extending through holes formed in the projections in an axial direction of the clutch, respectively; and stopper springs fixed to the projections, engaged with the stopper pins and adapted to allow a movement of the stopper pins toward the support member relatively to the intermediate plate and to prevent a movement of the stopper pins in the opposite direction relatively to the intermediate plate. Each stopper spring is made of bent metal sheet and has two end portions and a radially outer portion which are integrally formed between the two end portions. Each end portion covers end surface of the projection facing in the axial direction and is provided with an aperture, through which the stopper pin is inserted, and radial lips, which are divided by radial slit extending from the inner periphery of said aperture and are engaged with the stopper pin.

According to the above structure, the intermediate plate and the stopper pins are strongly connected together by means of stopper springs in the clutch disengaging operation, so that the intermediate plate does not move toward the pressure plate after the stopper pins contact the support member. Therefore, in the disengaging operation, the intermediate plate is not pressed to the facing at the pressure plate side.

When the facing wears, the intermediate plate can move smoothly toward the flywheel, even after the stopper pins contact the flywheel in the engaging operation, and there is not large frictional resistance between the stopper springs and the stopper pins. Therefore, the pressing force applied by the intermediate plate to the facing is not largely reduced by the resistance, and thus, the facing is pressed to the flywheel by a sufficiently large force.

Other and further objects, features and advantages of the invention will appear more fully from the following description of the preferred embodiments of the invention.

BRIEF DESCRIPTION OF THE INVENTION

FIG. 1 is a fragementary sectional view of an embodiment of the invention;

FIG. 2 is a schematic perspective view of the stopper spring in FIG. 1;

FIG. 3 is a schematic perspective view of other embodiment of the invention;

FIG. 4 is a developed plane view of a stopper spring in FIG. 3;

FIG. 5 is a fragementary sectional view of another embodiment of the invention;

FIG. 6 is a schematic sectional view of a known structure; and

FIG. 7 is a schematic perspective view of the structure in FIG. 6.

DETAILED DESCRIPTION OF THE PREFERRED EMBODIMENT

Referring to FIGS. 1 to 5, members and parts correpsonding to those in FIGS. 6 and 7 bear same reference numbers as those in FIGS. 6 and 7, and those members and parts will not be detailed hereinafter.

Referring to FIG. 1, outer peripheral projection 15 of an intermediate plate 5 are provided with holes 25 parallel to an output shaft 6 (FIG. 6), through which axially extending pins 27 are inserted with annular spaces therebetween, respectively. The holes and pins 27 have constant diameters through their whole lengths, respectively. A stopper spring 35 is fixed to each projection 15. The spring 35 is formed of bent metal sheet, such as spring steel, and has end portions 52 and 53 and one radially outer portion 54 integrally formed between the portions 52 and 53. The outer portion 54 covers the outer peripheral surface of each projection 15. The two end portions 52 and 53 cover the axially opposite end surfaces of each projection 15, which faces in the axial direction (D and E), respectively. Each stopper pin 27 is fitted into apertures 36 formed at both end portions 52 and 53 and extend therethrough toward the flywheel 1 and the flywheel ring 19, respectively. As shown in FIG. 2, each spring 35 is provided at the peripheral portions of the apertures 36 with radial lips 37 divided by radial slits or slots. As shown in FIG. 1, the inserted pins 27 engage the lips 37, and each group of the annularly arranged lips 37 are deflected into a tapered shape projecting toward the flywheel ring 19.

According to this embodiment, in order to move the intermediate plate 5 in the disengaging direction D relatively to the pins 27, it is necessary to deform the lips 37 so that the diameter of the each hole 36 may reduce, i.e., the engaging force against the pin 27 may increase, which results in a large sliding resistance. Therefore, in an actual structure, such movement of the plate 5 can surely be prevented. In order to move the intermediate plate 5 in the engaging direction E relatively to the pins 27, it is required only to deform the lips 37 so that the diameter of the holes 36 may increase, i.e., the engaging force against the pins 27 may reduce. Therefore, such deformation can be performed easily, and thus, the movement in the engaging direction E can be performed smoothly.

In an embodiment in FIGS. 3 and 4, each stopper spring 35 further includes one side portion 51, which are bent with respect to and integrally connected to the end portion 52. The side portion 51 covers one side surface of the projection 15 which faces substantially in a circumferential direction of the disk. An end portion 56 of the side portion 51, which extends at the vicinity of the end portion 53, are bent in the circumferential direction, and is engaged with the end surface of the projection 15.

According to this embodiment, the end portions 52 and 53 as well as the side portion 51 having the bent end portion 56 axially hold the projection 15, so that the stoppper spring 35 can be rigidly fixed to the projection 15 and the axial movement or rattle of the stopper spring 35 is prevented, which results in accurate positioning of the stopper pin 27.

A pair of bent side portions, corresponding to the portion 51 in FIG. 3, may be provided at circumferentially both sides of the spring 35 for further rigidly fixing the spring to the pin and for further accurately positioning the pin.

In an embodiment in FIG. 5, the spring 35 is provided at both end portions with radially inwardly extended portions, which are fixed to the projection 15 by a rivet 50.

In this embodiment, the rivet 50 prevents the axial movement or rattle of the stopper spring 35, and thus, the stopper spring 35 can further accurately position the stopper pin 27.

In the embodiments in FIGS. 3-5, the intermediate plate 5 can smoothly move only in the engaging direction E, and thus, basically same advantages as those of the embodiment in FIGS. 1 and 2 can be obtained.

According to the invention, as described above, since the intermediate plate 5 can smoothly move only in the engaging direction E relatively to the pins 27, the pressing force applied from the intermediate plate 5 to the facing 8 is not substantially reduced even when the facing 8 wears, and thus, the facing 8 can be pressed to the flywheel 1 by the sufficiently large force to transmit the sufficient large torque from the flywheel 1 to the facing 8. In the disengaging operation, the excessive returning of the intermediate plate 5 can be prevented.

Further, the stopper spring 35 of the bent form do not require a recess in the intermediate plate and an auxiliary plate which are used exclusively for fixing the stopper spring. Therefore, the structure can be simple.

Moreover, since each pin engages at two portions with the lips 37, the force applied at each engaged portion can be relatively small. Therefore, the wear of the engaged portions can effectively be prevented, which results in long durability.

Although the invention has been described in its preferred form with a certain degree of particularlity, it is understood that the structure of the preferred form may be changed in the details of construction, and that the combination and arrangement of parts may be modified to without departing from the spirit and scope of the invention as hereinafter claimed.

What is claimed is:

1. A device for adjusting a clearance of a twin clutch comprising;

a flywheel;

a pressure plate;

two clutch disks interposed between the flywheel and the pressure plate;

an intermediate plate disposed between the clutch disks and provided with radial projections;

a support member opposed to he flywheel with the intermediate plate therebetween;

stopper pins extending through holes formed in said projections in an axial direction of the clutch, respectively; and stopper springs fixed to said projections and engaged said stopper pins for allowing movement of said stopper pins toward said support member relatively to said intermediate plate and for preventing movement of said stopper pins in the opposite direction relative to said intermediate plate, each of said stopper springs being made of bent metal sheet and having two end portions and a radially outer portion integrally formed between said two end portions, each of said end portions covering end surfaces of the projection facing in the axial direction and being provided with an aperture, through which said stopper pin is inserted, and radial lips divided by radial slits extending from the inner periphery of said aperture, said radial lips projecting toward said support member and engaging the stopper pin for preventing said movement of said stopper pins in said opposite direction, each of said springs further includes a side portion integrally formed with and bent relatively to one of said end portions and having a bent end for engaging the end surface of the projection covered by the other of said end portions for preventing axial movement and rattle of said stopper spring.

* * * * *